(12) United States Patent
Huang et al.

(10) Patent No.: US 11,492,166 B2
(45) Date of Patent: Nov. 8, 2022

(54) AUTOMATIC HUB LABELING DEVICE AND PRODUCTION LINE

(71) Applicant: CITIC Dicastal Co., Ltd., Qinhuangdao (CN)

(72) Inventors: Liang Huang, Qinhuangdao (CN); Fuwang Zhang, Qinhuangdao (CN); Honglei Liu, Qinhuangdao (CN); Bao Zhang, Qinhuangdao (CN); Qingbo Kong, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 325 days.

(21) Appl. No.: 16/812,302

(22) Filed: Mar. 7, 2020

(65) Prior Publication Data
US 2021/0061509 A1    Mar. 4, 2021

(30) Foreign Application Priority Data

Aug. 28, 2019 (CN) .......................... 201910801055.5

(51) Int. Cl.
| | |
|---|---|
| *B32B 41/00* | (2006.01) |
| *B65C 9/18* | (2006.01) |
| *B07C 3/10* | (2006.01) |
| *G06T 7/00* | (2017.01) |

(52) U.S. Cl.
CPC .............. *B65C 9/1815* (2013.01); *B07C 3/10* (2013.01); *G06T 7/0004* (2013.01)

(58) Field of Classification Search
CPC ......... B65C 9/1815; B65C 9/40; B65C 1/021; B65C 9/36; B65C 9/46; B65C 9/02; B65C 9/08; B07C 3/10; B07C 5/36; B07C 5/3422; B07C 5/02; B07C 5/361; B07C 5/38; G06T 7/0004; B65G 47/8815; B65G 2201/0273
USPC ..................... 156/60, 64, 350, 351, 378, 379
See application file for complete search history.

(56) References Cited

U.S. PATENT DOCUMENTS

| | | | |
|---|---|---|---|
| 5,303,463 A * | 4/1994 | Pollard ................. | G01M 1/326 157/1.1 |
| 2016/0063770 A1* | 3/2016 | Bowers ..................... | B07C 3/14 156/64 |
| 2019/0294842 A1* | 9/2019 | Huang ............... | G06K 7/10831 |

\* cited by examiner

*Primary Examiner* — Michael N Orlando
*Assistant Examiner* — Joshel Rivera
(74) *Attorney, Agent, or Firm* — IPRO, PLLC

(57) ABSTRACT

The present disclosure relates to the field of hub packaging technology, and specifically to an automatic hub labeling device and a production line. A conveying mechanism conveys a hub to a camera identification module to determine a hub model, a printer can print multiple models of bar code or two-dimensional code labels and can automatically print a bar code or two-dimensional code label according to the wheel model, and the bar code or two-dimensional code label can be automatically pasted to a specified position according to the wheel model, so that automatic identification of the wheel model, automatic printing of the label and automatic pasting of the label are achieved, personnel participation is reduced, the production efficiency is improved, and customer complaints are reduced.

9 Claims, 2 Drawing Sheets

AUTOMATIC HUB LABELING DEVICE AND PRODUCTION LINE

FIELD

The present application relates to the field of hub packaging technology, and specifically to an automatic hub labeling device and a production line.

BACKGROUND

After the implementation of the New Car Three Guarantees Law, car factories require quality traceability of all car parts in the life cycle. Car hubs require identification as tracing carriers to implement traceability management after leaving the factory. Currently, wheel models are artificially identified in the packaging process after hubs are produced, and bar code (two-dimensional code) labels are pasted manually. Wheel model errors, label type errors, label printing errors, label pasting errors and the like often occur in production, resulting in complaints.

SUMMARY

Embodiments of the present application provide an automatic hub labeling device and a production line, which solve the problems in the background art, and can automatically identify a wheel model, automatically print a label and automatically paste the label, thereby reducing personnel participation, improving the production efficiency, and reducing customer complaints.

In order to achieve the above objectives, the present disclosure provides the following technical solution:

In a first aspect, an automatic hub labeling device is provided, comprising a conveying mechanism, a blocking component, a camera identification module, a label printer, and a label pasting mechanism, wherein the conveying mechanism is used for conveying a hub; the blocking component is capable of blocking the hub to stop the hub on the conveying mechanism, and releasing the hub to continue the conveying of the hub on the conveying mechanism; the camera identification module is located above the conveying mechanism, the camera identification module is connected to the label printer by signals, and the camera identification module is capable of shooting a hub, identifying a wheel model, and transmitting the wheel model information to the label printer; the label printer can print a label according to the received wheel model information; the label pasting mechanism can obtain the label from the label printer and paste the label to the hub.

In some embodiments, wherein the conveying mechanism comprises a frame, a motor and a conveyor belt, the conveyor belt being disposed on the frame, the motor being fixed to one end of the conveyor belt, and the motor driving the conveyor belt to rotate.

In some embodiments, wherein the blocking component comprises a lifting assembly and a baffle, the lifting assembly being fixed below the conveying mechanism, the baffle being fixedly disposed on an output end of the lifting assembly, and the lifting assembly being capable of driving the baffle to rise to block the hub, and driving the baffle to fall to release the hub; wherein the lifting assembly is a hydraulic cylinder, an air cylinder or an electric cylinder.

In some embodiments, wherein the camera identification module comprises a camera, an image identification module, and a holder, the camera being mounted on the holder, the camera being vertically downward, and the camera being able to shoot a spoke surface pattern of the hub; the image identification module being connected to the camera and the label printer, and the image identification module receiving the spoke surface pattern shot by the camera, identifying the wheel model, and transmitting the wheel model information to the label printer.

In some embodiments, wherein the label printer and the label pasting mechanism are disposed in a space below the conveying mechanism, and the label pasting mechanism comprises a lifting apparatus, a pasting guide post, a press driving apparatus, a press head, and a label sucker, the horizontal pasting guide post being fixedly disposed at the upper end of the lifting apparatus, the press driving apparatus being disposed on the pasting guide post, the press head being fixedly disposed at a moving end of the press driving apparatus, and the label sucker being fixedly disposed at the tail end of the pasting guide post; the label sucker being able to adsorb the label printed by the label printer, the lifting apparatus driving the pasting guide post, the press driving apparatus, the press head and the label sucker to move up to a position where the hub needs to be labeled, and the press driving apparatus driving the press head to move along the pasting guide post and to press the label adsorbed to the label sucker to paste the label to the hub.

In some embodiments, wherein the camera identification module can also automatically count the number of hubs, on-line and off-line time, shifts, and personnel information to facilitate warehouse management.

In a second aspect, the present application provides a sorting and labeling production line, comprising a first roller bed, a second roller bed, a third roller bed, a second blocking component, a sorting component, and a second camera identification apparatus, wherein the production line further comprises two automatic hub labeling devices according to any one of above embodiments, which are respectively an automatic hub labeling device I and an automatic hub labeling device II; the first roller bed and the second roller bed are connected into a straight line, the third roller bed is perpendicular to the second roller bed, the automatic hub labeling device I is disposed on the third roller bed, and the automatic hub labeling device II is disposed on the second roller bed; the second camera identification apparatus is disposed on the first roller bed, the second camera identification apparatus is connected to the blocking component and the sorting component by signals, and the second camera module shoots a hub, identifies wheel model information of the hub, judges the automatic hub labeling device corresponding to the hub according to the wheel model information, and controls the sorting component and the second blocking component to complete sorting; the sorting component and the second blocking component are disposed on the second roller bed and located between the second image identification module and the automatic wheel labeling device II, the sorting component faces the third roller bed, and the second blocking component is disposed on the side of the sorting component close to the automatic wheel labeling device II; the second camera identification apparatus judges that a hub should be conveyed to the automatic hub labeling device II, the second camera identification apparatus sends a signal to the second blocking component and the sorting component, the second blocking component and the sorting component are not started, and the hub is conveyed to the automatic hub labeling device II by the first roller bed and the second roller bed for labeling; the second camera identification apparatus judges that a hub should be conveyed to the automatic hub labeling device I, the second camera identification apparatus sends a signal to the second blocking component and the sorting component, the second blocking component rises to block the hub from being conveyed to the automatic hub labeling device II, the sorting component is started and pushes the hub to the third roller bed, and the hub is conveyed to the automatic hub labeling device I by the third roller bed for labeling.

In some embodiments, wherein the sorting component comprises a sorting plate, a telescopic assembly and a second hub detecting element, the sorting plate being fixed to an output end of the telescopic assembly, and the telescopic assembly being fixed to the outer side of the second roller bed corresponding to the third roller bed; the second hub detecting element being disposed on the second roller bed, and being capable of detecting the arrival of a hub; the sorting component being started when detecting the arrival of the hub, and pushing the hub to the third roller bed, wherein the telescopic assembly is a hydraulic cylinder, an air cylinder or an electric cylinder.

In some embodiments, wherein the second blocking component comprises a second lifting assembly and a second baffle, the second lifting assembly being fixed below the second roller bed, the second baffle being fixedly disposed on an output end of the second lifting assembly, and the second lifting assembly being capable of driving the baffle to rise to block the hub, and driving the baffle to fall to release the hub; wherein the second lifting assembly is a hydraulic cylinder, an air cylinder or an electric cylinder.

In a third aspect, the present application provides a continuous labeling production line, comprising a fourth roller bed, a fifth roller bed, a sixth roller bed, and two automatic hub labeling devices according to any one of above embodiments, which are respectively an automatic hub labeling device III and an automatic hub labeling device IV, wherein the fourth roller bed is connected to the automatic hub labeling device III and conveys a hub to the automatic hub labeling device III, the fifth roller bed is connected to the automatic hub labeling device III and the automatic hub labeling device IV, and the sixth roller bed is connected to an output end of the automatic hub labeling device IV and transports the labeled hub away; the label printers of the automatic hub labeling device III and the automatic hub labeling device IV can print a large label and a small label, the information in the large labels comprises product name, origin and time, and the information on the small label comprises inspector, inspection result and time; wherein the automatic hub labeling device III identifies hub model information, and judges not to paste or automatically paste the large label according to the hub model information; the automatic hub labeling device IV identifies hub model information, and judges not to paste or automatically paste the small label according to the hub model information.

Compared with the prior art, the present disclosure has the following beneficial effects:

The present disclosure provides an automatic hub labeling device and a production line, where a conveying mechanism conveys a hub to a camera identification module to determine a hub model, a printer can print multiple models of bar code or two-dimensional code labels and can automatically print a bar code or two-dimensional code label according to the wheel model, and the bar code or two-dimensional code label can be automatically pasted to a specified position according to the wheel model, so that automatic identification of the wheel model, automatic printing of the label and automatic pasting of the label are achieved, personnel participation is reduced, the production efficiency is improved, and customer complaints are reduced. In addition, a sorting and labeling production line can implement automatic screening of hubs and secondary confirmation of hub models to reduce identification errors and prevent label pasting errors. A continuous labeling production line can automatically identify a hub model, judge according to the setting whether a label needs to be pasted or how many labels are pasted, and implement pasting modes of mixed production with multi-mode, such as continuous pasting of large and small labels and selective pasting as required, thereby reducing personnel participation, preventing confusion in pasting a variety of labels, preventing complaints and improving production efficiency.

BRIEF DESCRIPTION OF THE DRAWINGS

In order to more clearly explain the technical solution in the embodiments of the application, drawings which require to be used in description of the embodiments are simply introduced below, obviously, the drawings in description below are some embodiments of the application, and those having ordinary skill in the art can further acquire other drawings without creative efforts according to those drawings.

In which: 1—conveying mechanism, 2—blocking component, 3—camera identification module, 4—label printer, 5—label pasting mechanism, 6—frame, 7—motor, 8—conveyor belt, 9—camera, 10—holder, 11—lifting apparatus, 12—lifting guide post, 13—pasting guide post, 14—press driving apparatus, 15—press head, 16—label sucker, 17—first roller bed, 18—second roller bed, 19—third roller bed, 20—second blocking component, 21—sorting component, 22—second camera identification module, 23—automatic hub labeling device I, 24—automatic hub labeling device II, 25—sorting plate, 26—telescopic assembly, 27—fourth roller bed, 28—fifth roller bed, 29—sixth roller bed, 30—automatic hub labeling device III, 31—automatic hub labeling device IV.

DETAILED DESCRIPTION OF EMBODIMENTS

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

In order to further understand the content, features and functions of the disclosure, the following embodiments are given and illustrated with the attached drawings as follows.

Embodiment 1

Figure 1:
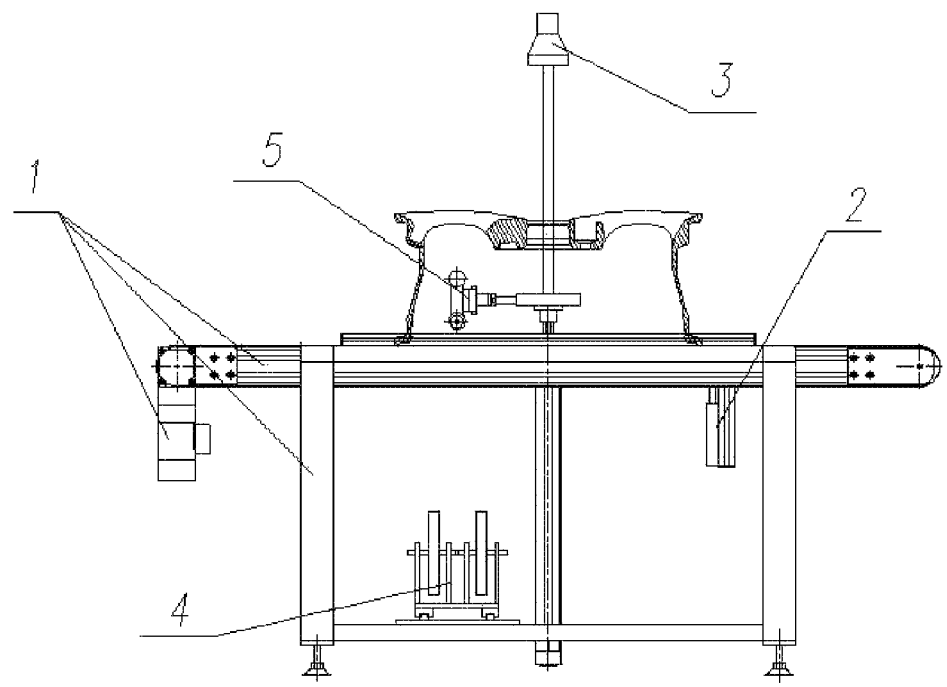
FIG. 1 is a schematic structural diagram 1 of an automatic hub labeling device according to the present application.
Figure 2:
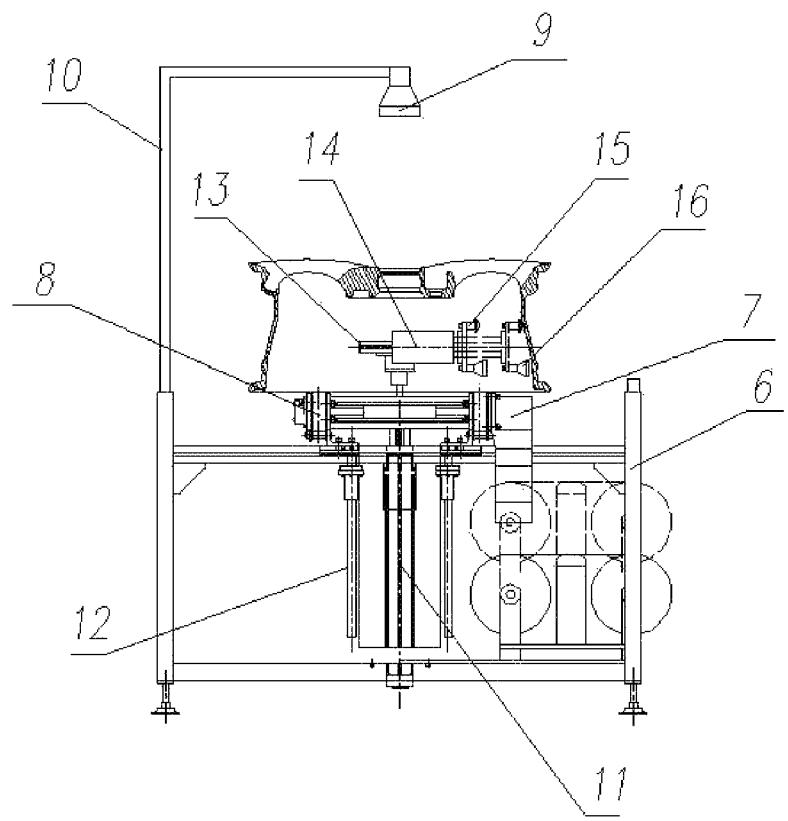
FIG. 2 is a schematic structural diagram 2 of the automatic hub labeling device according to the present application.

An automatic hub labeling device according to Embodiment 1 of the present application will be described below in combination with FIGS. 1 and 2, including a conveying mechanism 1, a blocking component 2, a camera identification module 3, a label printer 4, and a label pasting mechanism 5.

The conveying mechanism 1 is used for conveying a hub, the conveying mechanism 1 includes a frame 6, a motor 7 and a conveyor belt 8, the conveyor belt 8 is disposed on the frame 6, the motor 7 is fixed to one end of the conveyor belt 8, and the motor 7 drives the conveyor belt 8 to rotate. The blocking component 2 is capable of blocking the hub to stop the hub on the conveying mechanism 1, and releasing the hub to continue the conveying of the hub on the conveying mechanism 1. A first hub detecting element is disposed on the frame 6 of the conveying mechanism 1 near the blocking component 2, the first hub detecting element being capable of detecting the arrival of a hub and sending a signal to control the blocking component 2 to rise to block the hub. The blocking component 2 includes a lifting assembly and a baffle, the lifting assembly is fixed below the conveying mechanism 1, the baffle is fixedly disposed on an output end of the lifting assembly, and the lifting assembly is capable of driving the baffle to rise to block the hub, and driving the baffle to fall to release the hub; wherein the lifting assembly may be a hydraulic cylinder, an air cylinder or an electric cylinder.

The camera identification module 3 is located above the conveying mechanism 1, the camera identification module 3 is connected to the label printer 4 by signals, and the camera identification module 3 is capable of shooting a hub, identifying a wheel model, and transmitting the wheel model information to the label printer 4. The camera identification module 3 includes a camera 9, an image identification module, and a holder 10, wherein the camera 9 is mounted on the holder 10, the camera 9 is vertically downward, and the camera 9 can shoot a spoke surface pattern of the hub; the image identification module is connected to the camera 9 and the label printer 4, and the image identification module receives the spoke surface pattern shot by the camera 9, identifies the wheel model, and transmits the wheel model information to the label printer 4.

The label printer 4 can print a label according to the received wheel model information. The label pasting mechanism 5 can obtain the label from the label printer 4 and paste the label to the hub. The label printer 4 and the label pasting mechanism 5 are disposed in a space below the conveying mechanism, and the label pasting mechanism 5 includes a lifting apparatus 11, a pasting guide post 13, a press driving apparatus 14, a press head 15, and a label sucker 16, wherein the horizontal pasting guide post 13 is fixedly disposed at the upper end of the lifting apparatus 11, the press driving apparatus 14 is disposed on the pasting guide post 13, the press head 15 is fixedly disposed at a moving end of the press driving apparatus 14, and the label sucker 16 is fixedly disposed at the tail end of the pasting guide post 13; the label sucker 16 can adsorb the label printed by the label printer 4, the lifting apparatus 11 drives the pasting guide post 13, the press driving apparatus 14, the press head 15 and the label sucker 16 to move up to a position where the hub needs to be labeled, and the press driving apparatus 14 drives the press head 15 to move along the pasting guide post 13 and to press the label adsorbed to the label sucker 16 to paste the label to the hub. Lifting guide posts 12 are fixedly disposed on two sides of the lifting apparatus 11 on the frame 6, two guide sleeves are correspondingly fixedly disposed on the lifting apparatus 11, and the lifting guide posts 12 pass through the guide sleeves; the guide sleeves rise and fall with the rise and fall moving of the lifting apparatus 11 along the lifting guide posts 12.

In actual operation, the motor of the conveying mechanism 1 rotates such that the conveyor belt 8 drives a hub to move from left to right, the camera 9 shoots the hub, identifies the hub model and transmits the hub model to the label printer 4, and the label printer 4 prints a label according to the information such as wheel model. The first hub detecting element detects the arrival of the hub, and sends a signal to control the blocking component 2 to rise to block the hub. The lifting apparatus 11 drives the guide sleeves on the lifting guide posts 12 to move down, the label sucker 16 sucks the label on the label printer 4, and then the lifting apparatus 11 moves up along the lifting guide posts 12. The press driving apparatus 14 of the label pasting mechanism 5 moves forward on the pasting guide post 13 and drives the press head 15 to move forward, the label sucker 16 pastes the label to the hub, and the press head 15 presses the label.

In some other embodiments, the camera identification module 3 of the automatic hub labeling device further includes a software portion, which can automatically count the number of hubs, off-line time, shifts, personnel, etc., to facilitate warehouse management.

Embodiment 2

Figure 3:
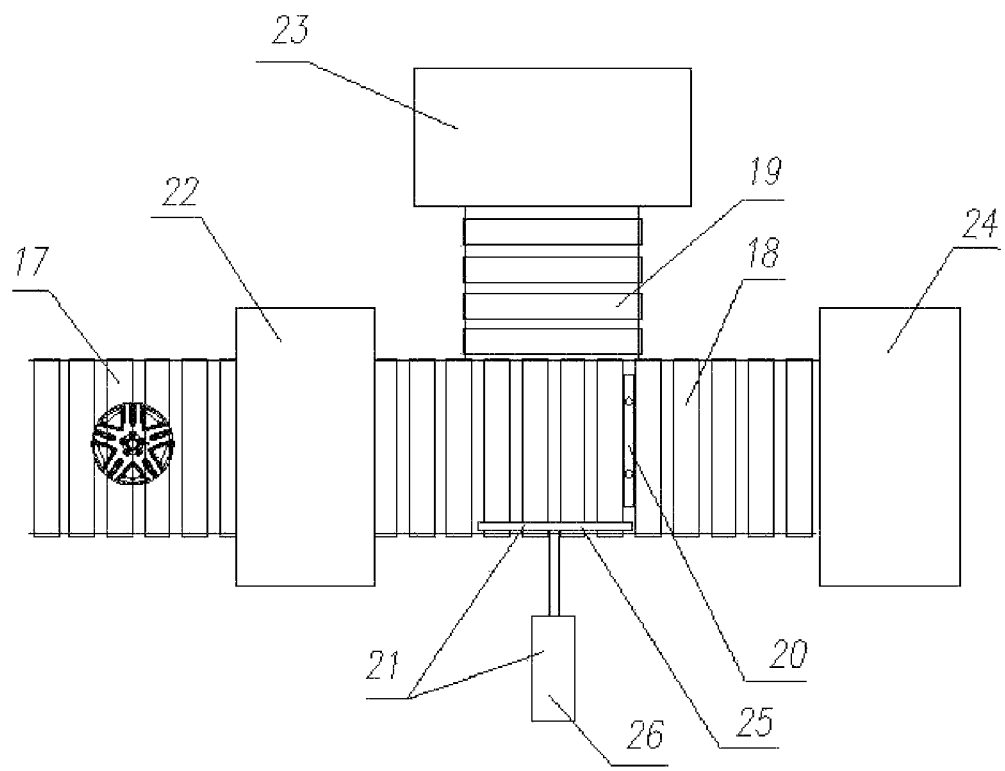
FIG. 3 is a schematic structural diagram of a sorting and labeling production line according to the present application.

A sorting and labeling production line according to Embodiment 2 of the present application will be described in combination with FIG. 3, which includes a first roller bed 17, a second roller bed 18, a third roller bed 19, a second blocking component 20, a sorting component 21, and a second camera identification module 22; wherein the production line further includes two automatic hub labeling devices as described in any of the above embodiments, which are respectively an automatic hub labeling device I 23 and an automatic hub labeling device II 24; the first roller bed 17 and the second roller bed 18 are connected into a straight line, the third roller bed 19 is perpendicular to the second roller bed 18, the automatic hub labeling device I 23 is disposed on the third roller bed 19, and the automatic hub labeling device II 24 is disposed on the second roller bed 18; the second camera identification module 22 is disposed on the first roller bed 17, the second camera identification module 22 is connected to the blocking component 2 and the sorting component 21 by signals, and the second camera module 22 shoots a hub, identifies wheel model information of the hub, judges the automatic hub labeling device corresponding to the hub according to the wheel model information, and controls the sorting component 21 and the second blocking component 20 to complete sorting; the sorting component 21 and the second blocking component 20 are disposed on the second roller bed 18 and located between the second image identification module 22 and the automatic wheel labeling device II 24, the sorting component 21 faces the third roller bed 19, and the second blocking component 20 is disposed on the side of the sorting component 21 close to the automatic wheel labeling device II 24; the sorting component 21 includes a sorting plate 25, a telescopic assembly 26 and a second hub detecting element, wherein the sorting plate 25 is fixed to an output end of the telescopic assembly 26, and the telescopic assembly 26 is fixed to the outer side of the second roller bed 18 corresponding to the third roller bed 19; the second hub detecting element is disposed on the second roller bed 18, and is capable of detecting the arrival of a hub and sending a signal to the telescopic assembly 26; the sorting component 21 is started when detecting the arrival of the hub, the telescopic assembly 26 elongates to push the sorting plate 25 forward, and the sorting plate 25 pushes the hub to the third roller bed 19, wherein the telescopic assembly 26 may be a hydraulic cylinder, an air cylinder or an electric cylinder. The second blocking component 20 includes a second lifting assembly and a second baffle, the second lifting assembly is fixed below the second roller bed 18, the second baffle is fixedly disposed on an output end of the second lifting assembly, and the second lifting assembly is capable of driving the baffle to rise to block the hub, and driving the baffle to fall to release the hub; wherein the second lifting assembly may be a hydraulic cylinder, an air cylinder or an electric cylinder.

The second camera identification module 22 judges that a hub should be conveyed to the automatic hub labeling device II 24, the second camera identification module 22 sends a signal to the second blocking component 20 and the sorting component 21, the second blocking component 20 and the sorting component 21 are not started, and the hub is conveyed to the automatic hub labeling device II 24 by the first roller bed 17 and the second roller bed 18 for labeling; the second camera identification module 22 judges that a hub should be conveyed to the automatic hub labeling device I 23, the second camera identification module 22 sends a signal to the second blocking component 20 and the sorting component 21, the second blocking component 20 rises to block the hub from being conveyed to the automatic hub labeling device II 24, the sorting component 21 is started and detects the arrival of the hub and pushes the hub to the third roller bed 19, and the hub is conveyed to the automatic hub labeling device I 23 by the third roller bed 19 for labeling.

In actual operation, the first roller bed is rotated to convey a hub from left to right, the wheel model information of the hub is identified when the hub passes through the second camera identification module 22, and the automatic hub labeling device corresponding to the hub is judged. When it is judged that the label pasting device corresponding to the hub is the automatic hub labeling device II 24, the sorting plate 25 is retracted, the second blocking component 20 falls, and the hub is conveyed to the automatic hub labeling device II 24 for pasting an A-type (square) bar code label. When it is judged that the label pasting device corresponding to the hub is the automatic hub labeling device I 23, the second blocking component 20 rises, the telescopic assembly 26 pushes the sorting plate 25, the sorting plate 25 pushes the hub to the third roller bed 19, and the hub is conveyed to the automatic hub labeling device I 23 for pasting a B-type (oblong) bar code label. In this embodiment, automatic screening of hubs and secondary confirmation of hub models can be implemented to reduce identification errors, and the label models are subdivided to prevent errors.

In some other embodiments, a sorting and labeling production line can correspond to a variety of automatic hub labeling devices, and paste a variety of labels, for example, paste dozens of labels at the same time.

In some other embodiments, each automatic hub labeling device in the labeling and labeling production line can automatically count the number of hubs, off-line time, shifts, personnel, etc., to facilitate warehouse management.

Embodiment 3

Figure 4:
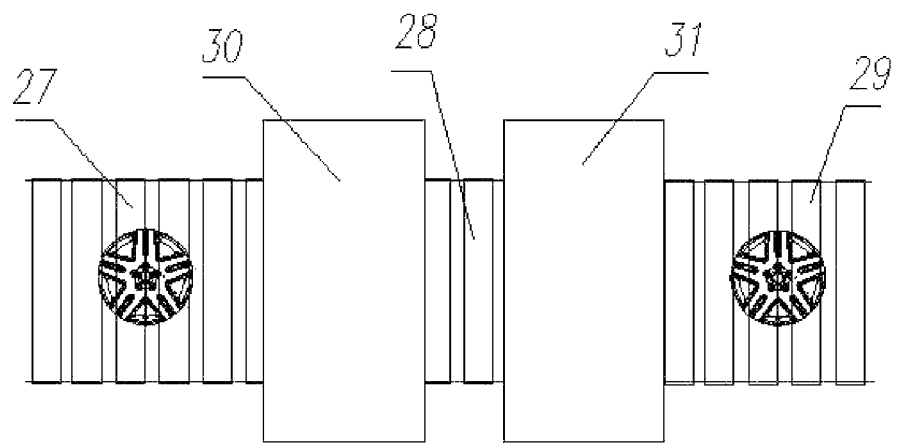
FIG. 4 is a schematic structural diagram of a continuous labeling production line according to the present application.

As shown in FIG. 4, a continuous labeling production line disclosed in the present application includes a fourth roller bed 27, a fifth roller bed 28 and a sixth roller bed 29, and further includes two automatic hub labeling devices as described in any of the above embodiments, which are respectively an automatic hub labeling device III 30 and an automatic hub labeling device IV 31, wherein the fourth roller bed 27 is connected to the automatic hub labeling device III 30 and conveys a hub to the automatic hub labeling device III 30, the fifth roller bed 28 is connected to the automatic hub labeling device III 30 and the automatic hub labeling device IV 31, and the sixth roller bed 29 is connected to an output end of the automatic hub labeling device IV and transports the labeled hub away; the label printers 4 of the automatic hub labeling device III 30 and the automatic hub labeling device IV 31 can print a large label and a small label, the information in the large labels includes product name, origin and time, and the information on the small label includes inspector, inspection result and time; wherein the automatic hub labeling device III 30 identifies hub model information, and judges not to paste or automatically paste the large label according to the hub model information; the automatic hub labeling device IV 31 identifies hub model information, and judges not to paste or automatically paste the small label according to the hub model information.

In FIG. 4, the fourth roller bed 27 is rotated to convey a hub from left to right, and the hub sequentially passes through the automatic hub labeling device III 30, the fifth roller bed 28, the automatic hub labeling device IV 31, and the sixth roller bed 29. The wheel model information of the hub is identified by the automatic hub labeling device III 30, and the large label (name brand label, with product name, origin, time, etc.) is not pasted or automatically pasted as needed. The wheel model information is identified when the hub passes through the automatic hub labeling device IV 31, and the small label (inspection label, with inspector, inspection result, time, etc.) is not pasted or automatically pasted as needed. In this embodiment, the hub model can be automatically identified, and whether a label needs to be pasted or how many labels are to be pasted is judged according to the setting, so that continuous pasting of the large and small label is realized, the participation of personnel is reduced, the confusion of multiple labels is prevented, complaints are prevented, and the production efficiency is improved.

In some other embodiments, a continuous labeling production line may include a plurality of automatic wheel labeling devices, for example, include more than a dozen automatic wheel labeling devices for selective pasting of large labels, small labels, parameter labels, etc.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

The invention claimed is:

1. An automatic hub labeling device, comprising a conveying mechanism, a blocking component, a camera identification module, a label printer, and a label pasting mechanism, wherein
the conveying mechanism is used for conveying a hub;
the blocking component is capable of blocking the hub to stop the hub on the conveying mechanism, and releasing the hub to continue the conveying of the hub on the conveying mechanism;
the camera identification module is located above the conveying mechanism, the camera identification module is connected to the label printer by signals, and the camera identification module is capable of shooting a hub, identifying a wheel model, and transmitting the wheel model information to the label printer;
the label printer can print a label according to the received wheel model information;
the label pasting mechanism can obtain the label from the label printer and paste the label to the hub;
the label printer and the label pasting mechanism are disposed in a space below the conveying mechanism, and the label pasting mechanism comprises a lifting apparatus, a pasting guide post, a press driving apparatus, a press head, and a label sucker, the horizontal pasting guide post being fixedly disposed at the upper end of the lifting apparatus, the press driving apparatus being disposed on the pasting guide post, the press head being fixedly disposed at a moving end of the press driving apparatus, and the label sucker being fixedly disposed at the tail end of the pasting guide post; the label sucker being able to adsorb the label printed by the label printer, the lifting apparatus driving the pasting guide post, the press driving apparatus, the press head and the label sucker to move up to a position where the hub needs to be labeled, and the press driving apparatus driving the press head to move along the pasting guide post and to press the label adsorbed to the label sucker to paste the label to the hub.

2. The automatic hub labeling device according to claim 1, wherein the conveying mechanism comprises a frame, a motor and a conveyor belt, the conveyor belt being disposed on the frame, the motor being fixed to one end of the conveyor belt, and the motor driving the conveyor belt to rotate.

3. The automatic hub labeling device according to claim 1, wherein the blocking component comprises a lifting assembly and a baffle, the lifting assembly being fixed below the conveying mechanism, the baffle being fixedly disposed on an output end of the lifting assembly, and the lifting assembly being capable of driving the baffle to rise to block the hub, and driving the baffle to fall to release the hub; wherein the lifting assembly is a hydraulic cylinder, an air cylinder or an electric cylinder.

4. The automatic hub labeling device according to claim 1, wherein the camera identification module comprises a camera, an image identification module, and a holder, the camera being mounted on the holder, the camera being vertically downward, and the camera being able to shoot a spoke surface pattern of the hub; the image identification module being connected to the camera and the label printer, and the image identification module receiving the spoke surface pattern shot by the camera, identifying the wheel model, and transmitting the wheel model information to the label printer.

5. The automatic hub labeling device according to claim 1, wherein the camera identification module can also automatically count the number of hubs, on-line and off-line time, shifts, and personnel information to facilitate warehouse management.

6. A sorting and labeling production line, comprising a first roller bed, a second roller bed, a third roller bed, a second blocking component, a sorting component, and a second camera identification apparatus, wherein the production line further comprises two automatic hub labeling devices according to claim 1, which are respectively an automatic hub labeling device I and an automatic hub labeling device II; the first roller bed and the second roller bed are connected into a straight line, the third roller bed is perpendicular to the second roller bed, the automatic hub labeling device I is disposed on the third roller bed, and the automatic hub labeling device II is disposed on the second roller bed; the second camera identification apparatus is disposed on the first roller bed, the second camera identification apparatus is connected to the blocking component and the sorting component by signals, and the second camera module shoots a hub, identifies wheel model information of the hub, judges the automatic hub labeling device corresponding to the hub according to the wheel model information, and controls the sorting component and the second blocking component to complete sorting; the sorting component and the second blocking component are disposed on the second roller bed and located between the second image identification module and the automatic wheel labeling device II, the sorting component faces the third roller bed, and the second blocking component is disposed on the side of the sorting component close to the automatic wheel labeling device II;
the second camera identification apparatus judges that a hub should be conveyed to the automatic hub labeling device II, the second camera identification apparatus sends a signal to the second blocking component and the sorting component, the second blocking component and the sorting component are not started, and the hub is conveyed to the automatic hub labeling device II by the first roller bed and the second roller bed for labeling; the second camera identification apparatus judges that a hub should be conveyed to the automatic hub labeling device I, the second camera identification apparatus sends a signal to the second blocking component and the sorting component, the second blocking component rises to block the hub from being conveyed to the automatic hub labeling device II, the sorting component is started and pushes the hub to the third roller bed, and the hub is conveyed to the automatic hub labeling device I by the third roller bed for labeling.

7. The sorting and labeling production line according to claim 6, wherein the sorting component comprises a sorting plate, a telescopic assembly and a second hub detecting element, the sorting plate being fixed to an output end of the telescopic assembly, and the telescopic assembly being fixed to the outer side of the second roller bed corresponding to the third roller bed; the second hub detecting element being disposed on the second roller bed, and being capable of detecting the arrival of a hub; the sorting component being started when detecting the arrival of the hub, and pushing the hub to the third roller bed, wherein the telescopic assembly is a hydraulic cylinder, an air cylinder or an electric cylinder.

8. The sorting and labeling production line according to claim 6, wherein the second blocking component comprises a second lifting assembly and a second baffle, the second lifting assembly being fixed below the second roller bed, the second baffle being fixedly disposed on an output end of the second lifting assembly, and the second lifting assembly being capable of driving the baffle to rise to block the hub, and driving the baffle to fall to release the hub; wherein the second lifting assembly is a hydraulic cylinder, an air cylinder or an electric cylinder.

9. A continuous labeling production line, comprising a fourth roller bed, a fifth roller bed, a sixth roller bed, and two automatic hub labeling devices according to claim 1, which are respectively an automatic hub labeling device III and an automatic hub labeling device IV, wherein the fourth roller bed is connected to the automatic hub labeling device III and conveys a hub to the automatic hub labeling device III, the fifth roller bed is connected to the automatic hub labeling device III and the automatic hub labeling device IV, and the sixth roller bed is connected to an output end of the automatic hub labeling device IV and transports the labeled hub away;

the label printers of the automatic hub labeling device III and the automatic hub labeling device IV can print a large label and a small label, the information in the large labels comprises product name, origin and time, and the information on the small label comprises inspector, inspection result and time;

wherein the automatic hub labeling device III identifies hub model information, and judges not to paste or automatically paste the large label according to the hub model information; the automatic hub labeling device IV identifies hub model information, and judges not to paste or automatically paste the small label according to the hub model information.

* * * * *